United States Patent [19]

Shepherd et al.

[11] Patent Number: 4,708,830
[45] Date of Patent: Nov. 24, 1987

[54] SEAL ASSEMBLY

[75] Inventors: Charles G. Shepherd, Oakville; Samuel Travale, Stoney Creek, both of Canada

[73] Assignee: B. D. Wait Co. Limited, Oakville, Canada

[21] Appl. No.: 938,478

[22] Filed: Dec. 5, 1986

[51] Int. Cl.$^4$ ............................................... B01F 3/04
[52] U.S. Cl. ..................................... 261/70; 137/426; 137/446
[58] Field of Search ................ 137/426, 446, 447; 261/70

[56] References Cited

U.S. PATENT DOCUMENTS

| | | | |
|---|---|---|---|
| 638,740 | 12/1899 | Morrison | 137/426 |
| 1,063,125 | 5/1913 | Gowey | 137/446 |
| 2,895,499 | 7/1959 | Nelson | 137/446 |
| 3,142,310 | 7/1964 | Feldermann | 261/70 |
| 3,405,687 | 10/1968 | Ruter | 137/426 |
| 4,490,311 | 12/1984 | Shepherd | 137/426 |

FOREIGN PATENT DOCUMENTS 1192112 8/1985 Canada .

Primary Examiner—Tim Miles
Attorney, Agent, or Firm—Rogers & Scott

[57] ABSTRACT

A seal assembly for use with a float valve whereby an inlet for liquid being admitted to a reservoir is shut to cut off liquid flow when a predetermined level of liquid has been admitted to the reservoir. The seal assembly comprises an adjustment knob and a collar located around the knob. The knob is used to select the level of liquid in the reservoir at which sealing is required and has a portion which is eccentric with respect to an axis of rotation of the knob. The collar has an inner wall which bears against the eccentric portion so that it can move radially upon rotation of the knob and make sealing contact with an inlet nozzle. An obstruction region provided on the collar, at which sealing occurs, has a deflector to either side so that spray from the inlet nozzle is controlled. Structure is provided to limit rotation of the collar with the knob. Conveniently, the arrangement provides adequate sealing with controlled spray characteristics relatively independently of the position of the adjustment knob.

14 Claims, 6 Drawing Figures

U.S. Patent  Nov. 24, 1987  4,708,830
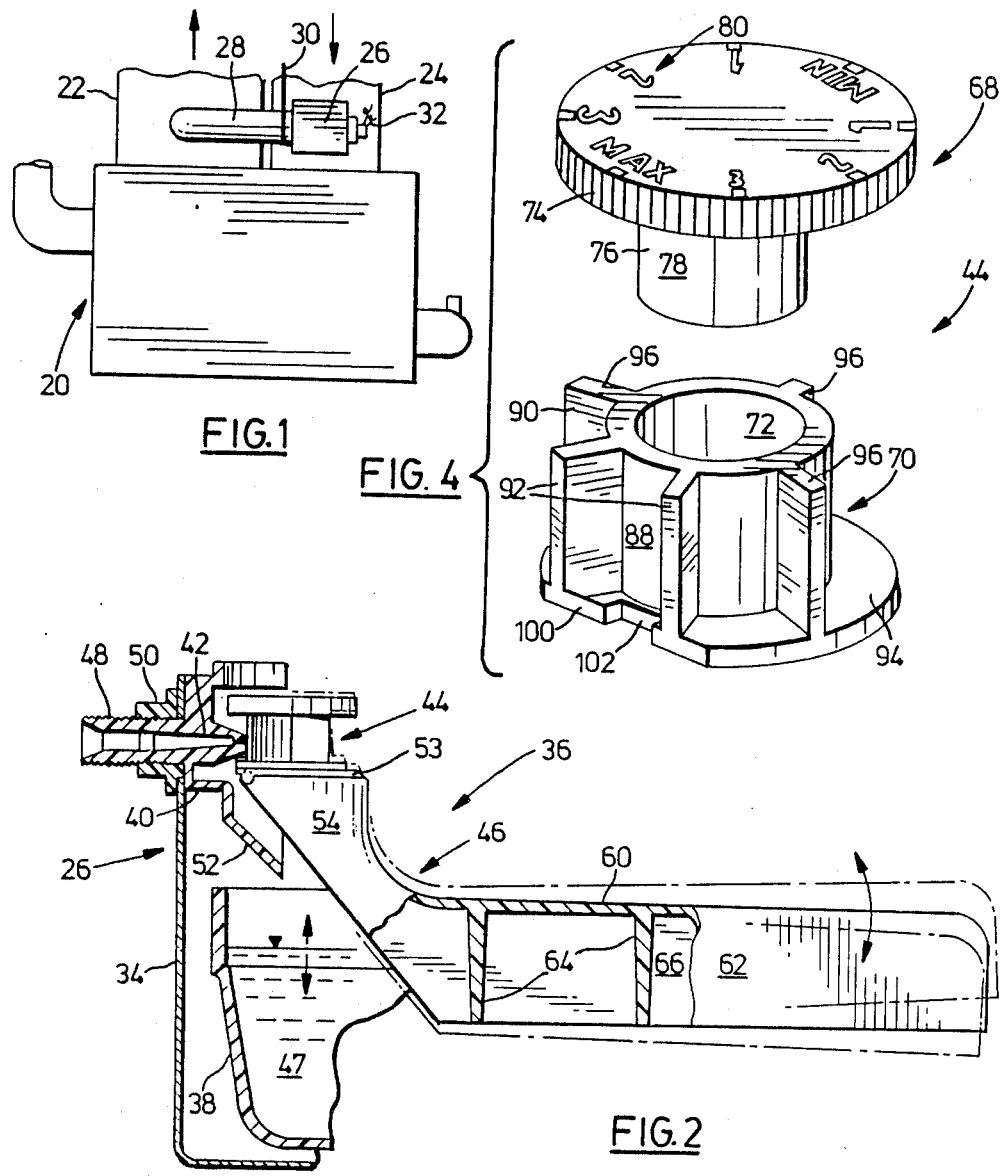

SEAL ASSEMBLY

FIELD OF THE INVENTION

This invention relates to a seal assembly for use in float valves which control liquid levels in a reservoir. More particularly, the invention relates to the component part of a float valve whereby an inlet for liquid being admitted to a reservoir is shut to cut off liquid flow when a predetermined level of liquid has been admitted to the reservoir.

BACKGROUND TO THE INVENTION

Reservoirs of all kinds require means to regulate the level of liquid stored so that valuable liquids are not wasted due to overflow and to avoid messy spills. Such reservoirs include, for example, chicken feeders, fish tanks, and humidifiers.

Float valves, or valve assemblies which have a float structure responsive to the liquid level of a reservoir are commonly used to regulate the flow of liquid and to prevent liquid spillage. Such valve assemblies have been used with humidifiers having water reservoirs which are operably connected to a continuous water supply, and in particular are known to have been used with humidifiers suitable for adding moisture to air circulated by a forced air furnace.

One such assembly for providing a controlled and repeatable adjustment of the maximum float structure height is described in Canadian Pat. No. 1,192,112. This valve assembly has a sealing member rotatably mounted on the float structure including a sealing surface engageable with an inlet nozzle. The sealing surface is eccentric to the axis of rotation of the sealing member to provide adjustment of the maximum height of the float structure on the water.

To contain spray emitted when water issues from the inlet nozzle, the sealing surface is recessed and a shroud is provided around the inlet nozzle. However, because the portion of the sealing surface which engages the inlet nozzle varies according to the adjustment of the maximum height of the float structure on the water, the valve assembly tends to have inconsistent characteristics with respect to containing spray.

An object of this invention is to provide a seal assembly for a valve assembly of the type described above in which spray is more adequately contained irrespective of the position of a sealing member relative to an inlet nozzle.

SUMMARY OF THE INVENTION

In accordance with one aspect of this invention, there is provided a seal assembly for a float valve adapted to control water entering an inlet nozzle located above a tray positioned to catch water from the nozzle. The float valve has a float structure mounted for angular movement responsive to the level of water in the tray, and the seal assembly includes a first part rotatably mounted to the float structure about an axis of rotation transverse to the inlet nozzle. A second part is mounted eccentrically on the first part for sealingly engaging the inlet nozzle, and for movement towards and away from the nozzle as the first part is rotated, to thereby adjust the water level.

BRIEF DESCRIPTION OF THE DRAWINGS

The invention is further described below with reference to a preferred embodiment by way of example only and with reference to the accompanying drawings in which:

FIG. 1 is a diagrammatic representation of a forced air furnace installation and shows an exemplary humidifier assembly in position on the furnace;

FIG. 2 is a part sectional view of a float valve including a seal assembly according to the invention and shown attached to a portion of a humidifier;

FIG. 3 is a plan view of the float valve;

FIG. 4 is an exploded perspective view of the seal assembly; and

DETAILED DESCRIPTION WITH REFERENCE TO THE DRAWINGS

Figure 5:
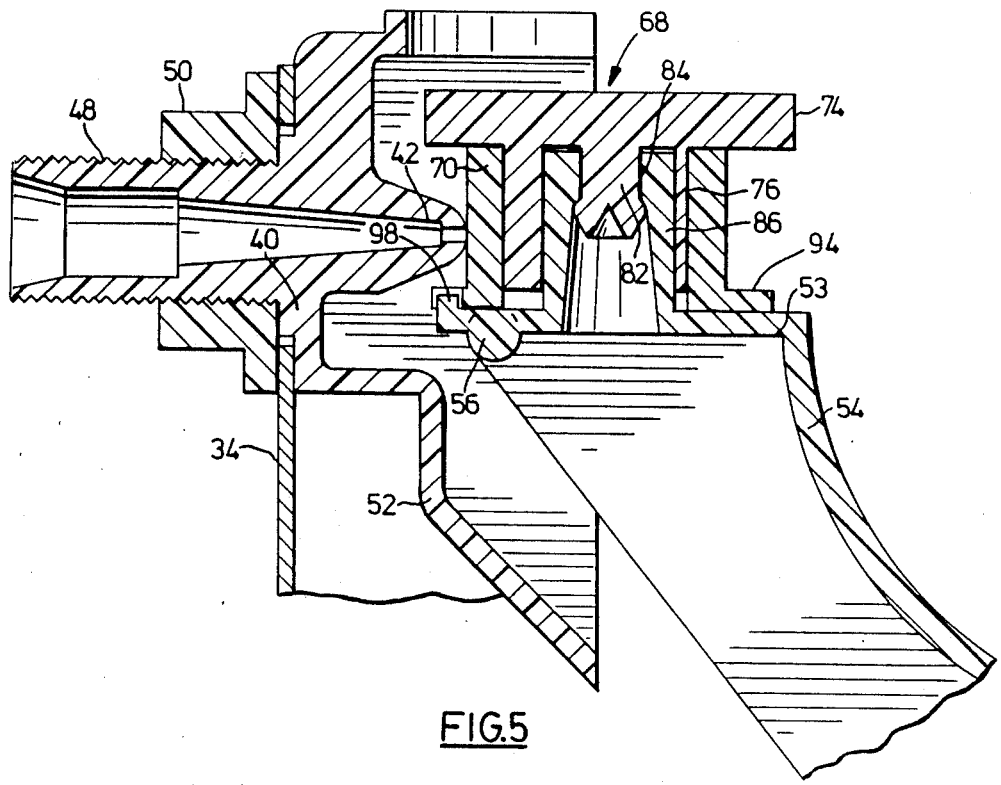
FIGS. 5 and 6 are sectional views of the float valve shown in FIG. 2 and drawn to a larger scale to show two settings of the seal assembly corresponding respectively to minimum and maximum water levels.

Although the following description of an embodiment of a seal assembly according to the invention is made with reference to a float valve used to control the level of water in a water tray for a humidifier of a forced air furnace, it will clearly be understood that a seal assembly according to the invention may be used in conjunction with float valves used to control the level of liquid being admitted to any suitably adapted reservoir of liquid.

Referring firstly to FIG. 1, a forced air furnace 20 delivers hot air to a hot air plenum 22 which delivers the air to a network of ducts for distribution about the interior of a house. Air is returned from the rooms of the house to a cold air return plenum 24 leading to a heat exchanger within the furnace for heating the air before it again leaves via the hot air plenum 22. A humidifier 26 is mounted on the cold air plenum 24 to receive hot air under pressure via a duct 28 attached to the hot air plenum 22. The resulting humidified air is then returned to the cold air plenum 24. Water is supplied to the humidifier by a water pipe 30 and electrical power is supplied through wires 32. (This is the preferred arrangement although it is recognized in the art that acceptable results can be achieved by mounting this type of humidifier on the hot air plenum 22 and thereby reversing the flow.)

Referring to FIG. 2, the humidifier 26 includes a housing 34 which supports a float valve 36 positioned above a water tray 38 to insure that an adequate supply of water is always available for humidifying air passing through the housing 34.

Float valve 36 includes a valve body 40 having an integral inlet nozzle 42, a seal assembly 44, and a float structure 46 which floats on water 47 in the tray 38. The float structure 46 is arranged so that water entering the inlet nozzle 42 from the water pipe 30 (FIG. 1) is cut off by the seal assembly 44 as it pivots driven by the float structure 46.

The inlet nozzle 42 communicates with the water pipe 30 through a threaded extension 48 and is clamped securely to the humidifier housing 34 by a nut 50 (shown clearly in FIG. 3). A shroud 52 integral with the valve body 40 is positioned around the inlet nozzle 42 and deflects water exiting the inlet nozzle 42 to direct it into the water tray 38.

The float structure 46 includes, at one end, a support platform 53 for carrying the seal assembly 44, and an arm 54 sloping downwardly from the platform 53. The arm 54 is connected pivotally to the valve body 40 by means of a pair of cylindrical trunnions 56 (FIG. 3) extending into suitable holes in the valve body 40. At the other end of the float structure 46, there is a float member 58 having a top 60 and a downwardly extending skirt 62 surrounding the top 60. The float member 58 is divided by partitions 64 into a number of cells 66 for trapping air and for making the float member 58 buoyant.

The seal assembly 44 snaps onto the float structure 46 and is coupled in a manner described below with reference to FIGS. 5 and 6.

Turning now to FIG. 4, the seal assembly 44 has an adjustment knob 68 rotatable about an axis of rotation which, in use, is transverse to the inlet nozzle 42, and which rotates within an annular collar 70 having a cylindrical inner wall 72.

The knob 68 includes a knurled disc 74 which overhangs a hollow stem 76 integrally formed with the disc 74. In order to provide varying degrees of adjustment of the maximum float structure height, the stem 76 has a cylindrical outer wall 78 which is eccentric with respect to the axis of rotation of the knob 68. Conveniently, the inner wall of the stem 76 is cylindrical and concentric with the axis of rotation of the knob 68. Together, the inner and outer walls of the stem 76 form a tube of which the wall thickness varies between points of maximum and minimum thickness which are opposite from one another on the stem circumference. Scaled markings 80 are provided on the periphery of the disc 74 to indicate a selected degree of adjustment of the float valve 36 and correspond to the thickness of the wall of the stem 76.

It will be appreciated that only one half turn of the adjustment knob 68 in either direction will provide a full scale variation of the maximum float structure 35 height. This can readily be seen in FIGS. 5 and 6 where the variation in the thickness of the stem 76 is apparent.

As mentioned above, FIGS. 5 and 6 also illustrate the coupling means for snapping the knob 68 onto the float structure 46. The knob 68 has an integral tang 82 coaxial with the axis of rotation and which extends downwardly into the stem 76. In use, the tang 82 snaps into engagement with an annular shoulder 84 provided on a spigot 86 extending upwardly from the float platform 53. The knob 68 rotates about the spigot 86 and makes sliding contact with the walls of the spigot 86 in the direction of rotation.

Returning to FIG. 4, the collar 70 has an obstruction region 88 which forms part of an outer wall 90 of the collar 70 and which faces the nozzle 42. To either side of the obstruction region 88 is one of a pair of water deflectors 92 extending radially and outwardly from the outer wall 90 of the collar 70 and supported on a transverse, outwardly directed annular flange 94. The flange 94 is located at one end of the collar 70 opposite the adjustment knob disc 74 and, in use, slides on the float platform 53 towards or away from the inlet nozzle 42 as the case may be. Three radial reinforcing ribs 96 extend outwardly from the outer wall 90 of the collar 70 and are located outside the obstruction region 88.

Due to friction between the collar 70 and the knob stem 78, the collar tends to rotate with the knob. In order to limit such rotation of the collar such that the obstruction region 88 is always substantially opposite to the nozzle 42, the float structure platform 53 is provided with an arresting lip 98 and the flange 94 has a truncated or flat portion 100. The flat 100 (clearly seen in FIG. 4) is defined by a chord extending between two peripheral points lying on the flange 94 outside the obstruction region 88 and beyond the deflectors 92. The spacing between the lip 98 and the flat 100 is selected such that to and from rotation of the knob 68 produces only a slight rocking movement in the collar 70, each swing of the collar 70 being arrested when flat 100 collides with the lip 98.

It will be understood that when the water level in the water tray 38 drops, the float structure 46 pivots downwardly about the trunnions 56 carrying the seal assembly 44 away from the inlet nozzle 42 and thereby allowing water to issue from the inlet nozzle 42 and enter the tray 38.

Conversely, when the water level rises, the float structure 46 pivots upwardly and towards the inlet nozzle 42 until the seal assembly 44 engages the end of the inlet nozzle 42 and seals it.

In the position illustrated in FIG. 5, the stem portion 76 having maximum wall thickness faces the obstruction region 88 of the collar 70. Rotation of the knob 68 reduces the wall thickness of the stem portion which faces the obstruction region and also reduces the gap between the collar 70 and the spigot 86. This causes the collar 70 to slide over the platform 53 of the float structure 56 away from the inlet nozzle 42 and lip 98 to eventually reach the FIG. 6 position in which the stem portion having minimum wall thickness faces the obstruction region. Further rotation of the knob will return the collar to the FIG. 5 position.

Figure 6:
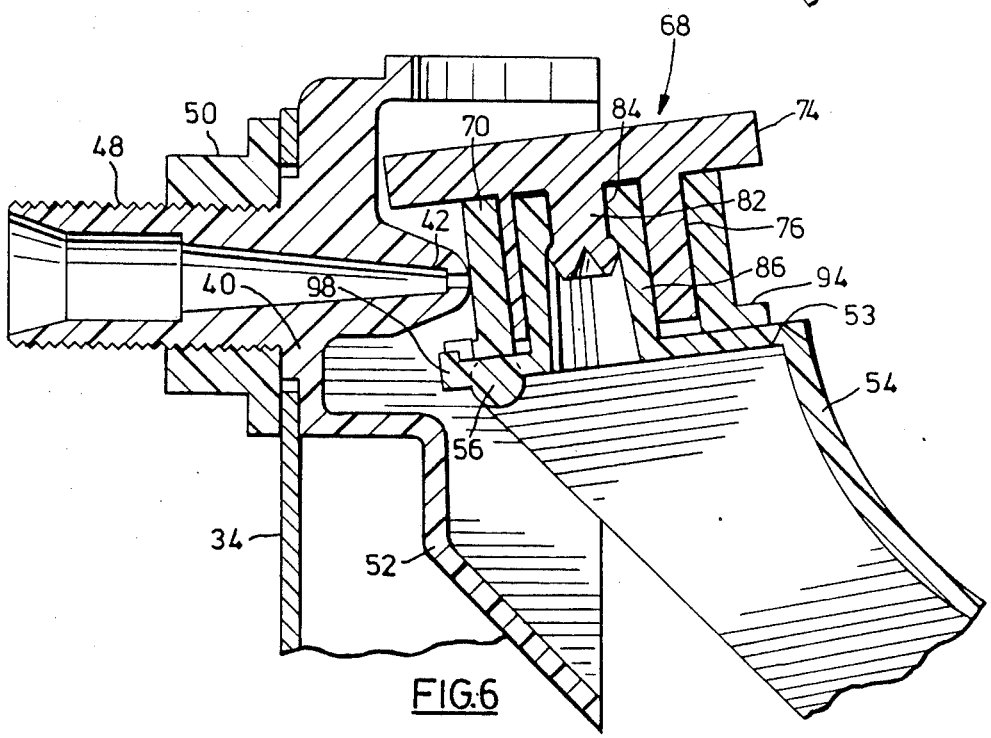

It will be understood that an 180 degree rotation of the knob 68 is required to change the configuration illustrated in FIG. 5 to the configuration illustrated in FIG. 6. In so doing, the spacing of the flat 100 from the lip 98 is increased, and the float structure 46 will pivot to a greater height relative to the tray 38 for the obstruction region 88 to be brought into sealing engagement with the inlet nozzle 42.

During normal use of the humidifier 26 when there is a demand for water, the inlet nozzle 42 and obstruction region 88 are separated very slightly. As a result, water exits from the inlet nozzle 42 and impinges on the obstruction region 88 where it tends to form a spray. The water deflectors 92 and overhanging disc 74 limit the spray by directing it into the shroud 52. The shroud 52, in turn, deflects the water and directs it into the water tray 38 where it is stored for humidifying air. Relatively consistent spray containing characteristics are maintained because the position of the water deflectors 92 relative to the nozzle 42 is substantially fixed and varies only slightly even upon a full scale rotation of the adjustment knob 68.

Preferably, the seal assembly 44 is made of an injection moulded plastics material such as polyurethane and is resilient, particulary in the region of the obstruction region 88, so that it can be deformed by the inlet nozzle 42 and form a better seal. Alternatively, the seal assembly 44 may be made from a material having similar physical characteristics.

It will be understood that the invention is not limited to the above-described embodiment and that several variations, as may occur to those skilled in the art, may be made. In particular, the configuration and shape of the deflectors may vary considerably. It will also be appreciated that the cylindrical walls of sliding parts described may be notched or may adopt other configurations to releasably lock the adjustment knob into selected positions. Locating formations and attachment means may also vary considerably as will be apparent to those skilled in the art, for example, the nozzle and collar could be dimensioned to co-operate such that rotation of the collar with the knob is limited and the knob stem could have an outwardly extending pin rotatably held on a bearing provided on the float structure.

The invention thus provides simple means for advantageously controlling spray in a seal assembly of the type described.

We claim:

1. A seal assembly for a float valve adapted to control liquid entering the float valve via an inlet nozzle located above a receptacle positioned to catch liquid from the nozzle, the float valve having a float structure mounted for angular movement responsive to the level of liquid in the receptacle, and the seal assembly comprising an adjustment knob and a collar located around the knob;

the adjustment knob being adapted to be coupled to the float structure for rotation about an axis of rotation which, in use, is transverse to the inlet nozzle;

and the knob having an outer wall of which at least a portion is eccentric with respect to said axis of rotation;

the collar having an inner wall which bears against said eccentric portion such that the collar may move radially when the knob is rotated;

the collar further having an outer obstruction region for sealingly engaging the inlet nozzle at a liquid level in the receptacle selected by rotation of the adjustment knob, and determined by the spacing between the obstruction region and the axis of rotation;

at least one deflector being provided to either side of the obstruction region to limit spray from the inlet nozzle; and the seal assembly having locating means adapted to co-operate with the float valve for minimizing rotation of the collar with the knob.

2. A seal assembly according to claim 1 wherein the knob comprises a stem having a cylindrical outer wall which includes said eccentric portion and a disc overhanging the stem.

3. A seal assembly according to claim 2 wherein the stem is tubular.

4. A seal assembly according to claim 3 wherein the inner wall of the stem is concentric with the axis of rotation and the adjustment knob has coupling means comprising an integral tang co-axial with the axis of rotation which extends downwardly into the stem and is spaced from the inner stem wall.

5. A seal assembly according to claim 2 wherein the disc has a knurled edge to facilitate grasping the knob.

6. A seal assembly according to claim 2 wherein the disc has scaled markings on the periphery indicative of the liquid levels selected for the receptacle.

7. A seal assembly according to claim 1 wherein the collar inner wall is cylindrical.

8. A seal assembly according to claim 2 wherein the collar has a transverse, outwardly directed flange at one end which in the assembled seal assembly is located opposite the adjustment knob disc and which supports the deflectors.

9. A seal assembly according to claim 1, wherein the seal assembly is made from injection moulded synthetic plastic material.

10. In apparatus for humidifying air in a forced air heating system and including a housing, a float valve attached to the housing and having a fixed nozzle, a movable float structure and a seal assembly mounted in the float structure and co-operating with the nozzle for controlling flow of water through the nozzle, a tray receiving water to a level controlled by the float structure moving with the water level and thereby opening and closing the float valve, and an evaporator which lifts water from the tray into air moving through the housing from the heating system, the improvement in which the seal assembly has a first part rotatably mounted to the float structure about an axis of rotation transverse to the inlet nozzle, and a second part mounted eccentrically on the first part for sealingly engaging the inlet nozzle, and for movement towards and away from the nozzle, as the first part is rotated, to thereby adjust the water level.

11. Apparatus according to claim 10 wherein the first part has an outer wall of which at least a portion is eccentric with respect to the axis of rotation; and the second part has an inner wall which bears against said eccentric portion such that the second part may move radially when the first part is rotated;

the second part further having an outer obstruction region for sealingly engaging the inlet nozzle at a water level in the tray selected by rotation of the first part, and determined by the spacing between the obstruction region and the axis of rotation;

at least one deflector being provided to either side of the obstruction region to limit spray from the inlet nozzle; and the seal assembly having locating means adapted to co-operate with the float valve for minimizing rotation of the second part with the first part.

12. Apparatus according to claim 11 wherein the first part comprises a stem having a cylindrical outer wall which includes said eccentric portion and a disc overhanging the stem.

13. Apparatus according to either of claims 11 and 12 wherein the inner wall of the second part is cylindrical.

14. A humidifier for adding moisture to air circulated by a forced air furnace comprising:

a housing adapted to receive drier air from either a cold or hot air plenum of the furnace and deliver moist air to the other plenum, the housing being connected to electrical supply means and water supply means;

a float valve attached to the housing and adapted to regulate water flow such that an adequate supply of water is always available;

a water tray for receiving water from the float valve; and an evaporator adapted to lift water from the tray into a draft of air circulating through the housing;

the float valve having a seal assembly, an inlet nozzle located above the water tray positioned to catch water from the nozzle, and a float structure mounted for angular movement responsive to the level of water in the tray, in which the seal assembly has a first part rotatably mounted to the float structure about an axis of rotation transverse to the inlet nozzle, and a second part mounted eccentrically on the first part for sealingly engaging the inlet nozzle, and for movement towards and away from the nozzle, as the first part is rotated, to thereby adjust the water level.

* * * * *